United States Patent [19]

Bernt et al.

[11] 3,819,487
[45] June 25, 1974

[54] STABLE NADH COMPOSITIONS

[75] Inventors: Erich Bernt, Munich; Hans Ulrich Bergmeyer, Tutzing, Upper Bavaria; Marianne Grassl, Munich; Wolfgang Gruber, Garatshausen; Klaus Beaucamp, Tutzing, Upper Bavaria, all of Germany

[73] Assignee: Boehringer Mannheim GmbH., Mannheim, Germany

[22] Filed: Sept. 17, 1971

[21] Appl. No.: 181,640

[30] Foreign Application Priority Data
Oct. 13, 1970 Germany............................ 2050267

[52] U.S. Cl....... 195/99, 195/103.5 R, 260/211.5 R
[51] Int. Cl. .......................................... G01n 31/14
[58] Field of Search............... 195/100, 103.5 R, 99; 34/15; 260/211.5 R

[56] References Cited
UNITED STATES PATENTS
2,399,246  4/1946  Patrick et al. ........................ 34/15 X
3,413,198  11/1968  Deutsch ........................ 195/103.5 R
3,552,030  1/1971  Jason et al. .......................... 34/15 X FOREIGN PATENTS OR APPLICATIONS
1,153,109  5/1969  Great Britain ............... 195/103.5 R OTHER PUBLICATIONS
Strandjord et al., "Fed. Proc." 21:239 (1962).
Noyes, "Freeze Drying of Foods and Biologicals" p.5 (1968).

Primary Examiner—Alvin E. Tanenholtz
Attorney, Agent, or Firm—Burgess, Dinklage & Sprung

[57] ABSTRACT

Storage stable reduced nicotinamide-adenine-dinucleotide (NADH) compositions, which do not form dehydrogenase inhibitors of prolonged time periods, are produced by forming a dilute aqueous solution of inhibitor-free NADH and maintaining this solution in a thin layer vacuum.

6 Claims, No Drawings

STABLE NADH COMPOSITIONS

The present invention is concerned with storage-stable reduced nicotinamide-adenine-dinucleotide (NADH) compositions which, over prolonged periods of time, do not form dehydrogenase inhibitors, and with a process for their preparation.

The determination of the activity of dehydrogenases, for example, of lactate dehydrogenase or of α-hydroxybutyrate dehydrogenase, is carried out in the presence of NADH, which plays the part of the co-enzyme, for example according to the following equation:

pyruvate + NADH + H$^+$ 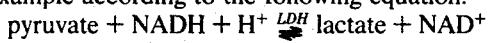 lactate + NAD$^+$

It is known that the usual degree of purity of NADH are not sufficient for storage stability. For example, lyophilized NADH, even when it is stored at 4°C., forms materials which inhibit dehydrogenases and, even when present in very small concentrations, result in the simulation of enzyme values which are too small. The errors thus caused cannot be overcome by using larger amounts of NADH because this would also increase the concentration of inhibitor material (see A. Haertel and R. Helger, Z. klin. Chem. u. klin, Biochem., 1968, pp. 259 – 262). Since, hitherto, a satisfactory process for the prevention of this inhibitor formation has not been found, NADH, even after relatively short storage time, must, or should, be purified from inhibitor formed before being used for the determination of the dehydrogenases. This, however, requires laborious purification steps, for example, column chromatography over diethylaminoethyl-cellulose (see R. B. McComb and Royal J. Gay, Clin. Chemistry, 14, 754 – 762/1968).

The present invention provides a process for the preparation of, and compositions of, NADH which is stabilized against inhibitor formation for a comparatively long time.

The process of the present invention comprises forming a dilute, aqueous solution of inhibitor-free NADH, and maintaining this solution in a thin layer in a vacuum at about ambient, e.g., room, temperature until dry.

The aqueous solution of NADH used preferably has an initial NADH concentration of less than 5 percent by weight.

In carrying out the process, the layer of NADH solution should have the smallest possible thickness, e.g., less than 1,000 microns.

The process is preferably carried out at a vacuum of less that 30 mm. Hg. and the temperature used is preferably 20° to 35°C.

By the use of the process according to the present invention, the NADH is obtained in glassy form on a layer carrier. Surprisingly, the NADH preparation thus obtained is also stable at ambient temperature against inhibitor formation for months on end. By the term "inhibitor" as used herein there is meant a substance which reduces the activity of dehydrogenases.

NADH obtained according to the process of the present invention is, with regard to its stability, considerably superior to material obtained by lyophilization of inhibitor-free NADH, as the following results of comparative experiments show. In both cases, an inhibitor-free NADH material was used as the starting material:

| storage period in weeks at 33°C. | LDH activity found according to the invention | lyophilized |
|---|---|---|
| 0 | 100% | 100% |
| 1 | 99% | 83% |
| 2 | 98% | 74% |
| 3 | 98% | 65% |
| 4 | 98% | 53% |
| 5 | 98% | 30% |

The above results show that, with the NADH prepared according to the process of the present invention, after storage for 5 weeks at 33°C., 98 percent of the original LDH activity (LDH = lactate dehydrogenase) can still be measured, whereas a lyophilized NADH preparation only gives 30 percent of the original value. Thus, there is only a reduction of activity of 2 percent in the case of NADH obtained according to the process of the present invention, whereas there is a reduction of activity of 70 percent in the case of NADH obtained according to the known process.

The NADH prepared according to the process of the present invention, because of its substantially improved stability, can be used for the preparation of combined test reagents for the determination of dehydrogenases, for example, of LDH, α-HBDH (hydroxybutyrate dehydrogenase), SDH and the like. Therefore, a reagent of this type for the determination of a dehydrogenase consists of a. NADH prepared according to the process of the present invention and
b. a solution of the appropriate dehydrogenase substrate in aqueous buffer, in an unmixed state before use.

The dehydrogenase substrates are, for example, pyruvate for lactate dehydrogenase (LDH) and α-ketobutyrate for α-hydroxybutyrate dehydrogenase (α-HBDH).

A reagent according to the present invention for the determination of lactate dehydrogenase expediently comprises, as component (b), 0.05 to 0.2M aqueous phosphate buffer (pH 7.2 to 7.8, preferably 7.5) containing 0.1 to 0.5 mM pyruvate.

Similarly, a reagent for the determination of α-HBDH contains α-ketobutyrate instead of pyruvate.

The following Examples are given for the purpose of illustrating the present invention and should not be construed as unduly limitative thereof.

EXAMPLE 1

Preparation of stable NADH composition 0.05 ml. amounts of a 1 percent inhibitor-free, aqueous NADH solution were pipetted into small bottles. A vacuum of less than 20 mm.Hg. was then applied and the bottles were left to stand at 25° to 30°C. until completely dry (3 to 4 hours). The bottles were thereafter closed at atmospheric pressure. The NADH compositions thus obtained were stable at ambient temperature for at least 6 months, without inhibitor formation and, after dissolving in a buffer/substrate solution, could be used for the determination of the appropriate dehydrogenase.

EXAMPLE 2

Preparation of determination of the LDH activity 3 ml. of a 0.1M phosphate buffer solution (pH 7.5) containing 0.3 mM pyruvate, were introduced into one of the bottles containing NADH prepared according to Example 1. The NADH dissolved completely within a few seconds. The solution thus obtained was then placed in a measurement cuvette, mixed with 0.1 ml. test solution, for example serum, and the NADH decrease was a measure for the LDH activity contained in the test solution.

It will be understood that the specification and examples are illustrative but not limitative of the present invention and that other embodiments within the spirit and scope of the invention will suggest themselves to those skilled in the art.

What is claimed is:

1. Process for the preparation of stable NADH compositions, which process comprises forming a dilute, aqueous solution of inhibitor-free NADH containing less than 5 percent by weight of NADH and maintaining this solution in a thin layer having a thickness of less than 1,000 microns in a vacuum at about room temperature until dry.

2. A process as claimed in claim 1, wherein an absolute pressure of less than 30 mm.Hg. is used.

3. A process as claimed in claim 1, wherein the temperature used is about 20° to about 35°C.

4. Stable NADH composition in glassy form stable against inhibitor formation prepared by the process of claim 1.

5. A reagent for the determination of a dehydrogenase by means of NADH, comprising:
   a. NADH composition as claimed in claim 4 and
   b. a solution of the appropriate dehydrogenase substrate in an aqueous buffer,
in an unmixed state before use.

6. A reagent as claimed in claim 5 for the determination of lactate dehydrogenase, wherein component (b) comprises a 0.05 to 0.2M aqueous phosphate buffer of pH 7.2 to 7.8, containing 0.1 to 0.5 mM pyruvate.

* * * * *